United States Patent Office 2,899,004
Patented Aug. 11, 1959

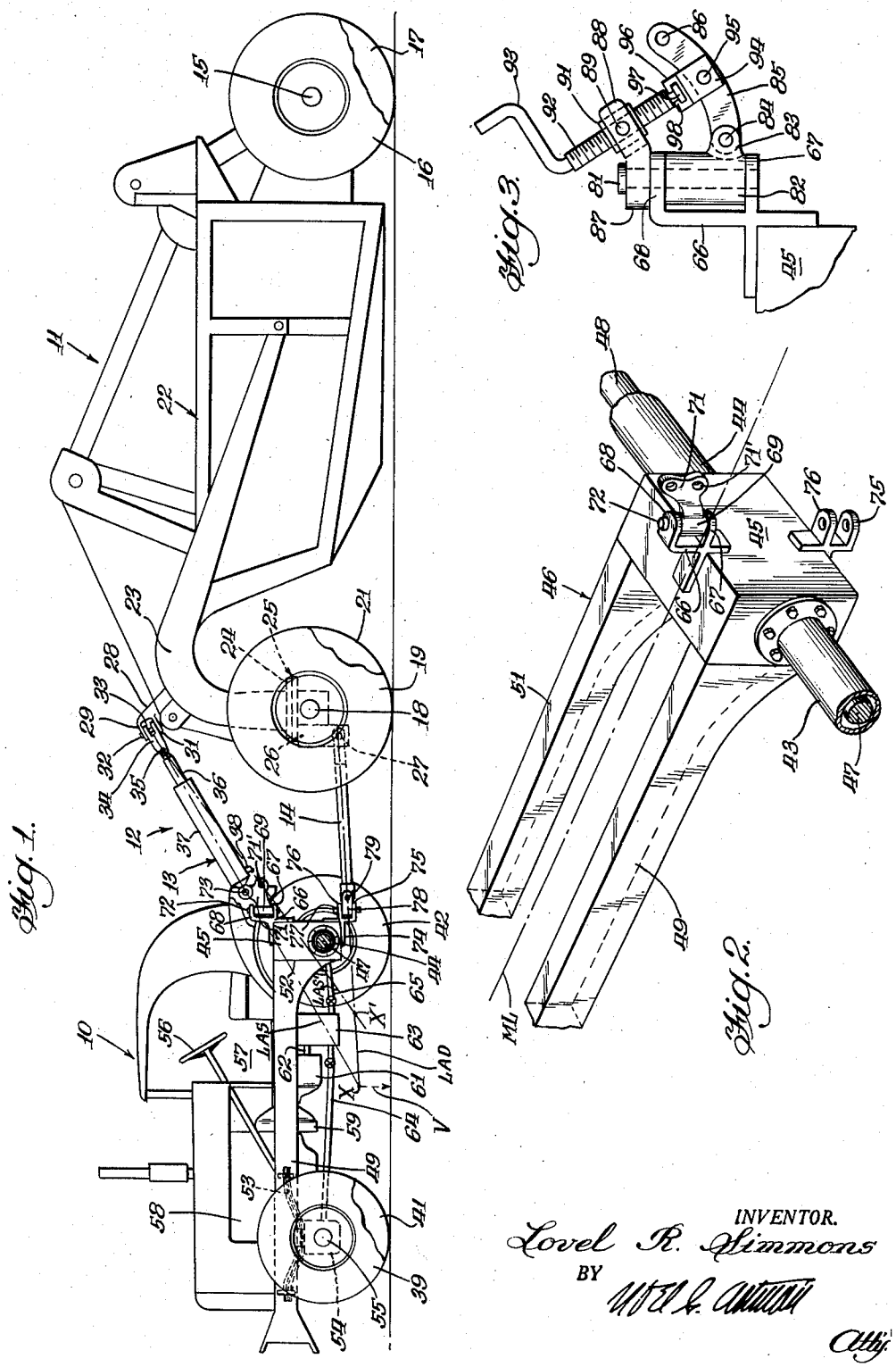

2,899,004

WEIGHT-TRANSFERRING HITCH FOR FOUR-WHEEL-DRIVE TRACTORS

Lovel Reynolds Simmons, Jackson, Miss.

Application July 8, 1955, Serial No. 520,796

10 Claims. (Cl. 180—14)

This invention concerns weight-transferring hitch structures employed in towing relation between tractor and trailer vehicles and more particularly concerns such a hitch structure operable at will in combination with a tractor having both front and rear sets of traction wheels, to transfer weight from the front portion of the towed vehicle onto the tractor in a manner to impose the transferred weight onto both sets of traction wheels. The invention is an improvement over the arrangement shown in my United States Patent No. 2,360,901.

It is now known, as disclosed in said patent, that the traction of tractor traction wheels can be improved during temporary conditions of poor traction by imposing a downward force thereonto by using a species of towing hitch energizable for lifting the front axle of a two axle trailer for transferring the weight of the lifted front portion of the trailer onto the tractor. The species of hitch structure employed includes a steering tongue or draft member projecting forwardly from the trailer into pivotal connection with the rear portion of the tractor to dispose the tongue substantially in a horizontal position of relatively low elevation. Also pivotally connected with the rear portion of the tractor is an elongated and forcibly expandible hydraulic ram which projects rearwardly and upwardly into pivotal connection with an anchorage at a position of higher elevation on a forward portion of a trailer. When the ram is forcibly extended the forward end of the tongue is urged downwardly attendant to the draft member and ram tending to raise the front end of the trailer. In this manner the lifting force applied to the front end of the trailer is transferred onto the tractor. In my Patent No. 2,360,901 and in United States Patent No. 2,377,315 to Horace C. Beitzel it is taught that with a weight-transferring hitch structure of this species the downward component of force transferred from the trailer onto the tractor can be concentrated upon the rear traction wheels by causing the converging lines of force of the inclined ram and the horizontal draft member to intersect substantially beneath the rear axle of the tractor. This prevents the transferred weight from being imposed in a position rearwardly of the rear axle which would tend to tip the tractor in a manner raising the front wheels from the ground.

As use of the weight transferred system above described has expanded, the tractors and trailers have increased in size so that now the static rear axle weight of the tractor, that is, the combined ground-contacting force of the rear traction wheels of the tractor without weight being transferred thereto from the trailer, typically falls within the range of 21,000 to 36,000 pounds. In these tractors the static front axle weight will range from 7,000 to 14,000 pounds. Without the presence of the considerable static rear axle weight of the rear axle traction wheel tractor, adverse towing conditions, principally off the highway, would make it mandatory to energize the weight transfer hitch structure such a great percentage of the time to enable the tractor to maintain traction that the hitch structure would deteriorate at an inordinate rate.

This enormous static weight of the rear axle of the tractor has imposed impediments upon the mobility of the vehicle over highways. Although the equipment normally operates off of the highway in the vicinity of the places of loading and dumping, it is frequently necessary to tow the loaded trailer over improved highways, and, when a contractor moves from one construction location to another it is most economical if the tractor can be transported on its own wheels over improved highways. Since the common maximum axle loading of vehicles allowed upon improved highways is 18,000 pounds these tractors are not permitted to be driven over such highways unless they can be stripped of weight upon their rear axle by removing such items as power control units, fender weights, etc. Should the stripped weight of the tractor be such that the rear axle weight still exceeds the load limit, it is necessary to obtain a special permit to proceed over a specified route upon the highway or to load the tractor onto a carrier vehicle which distributes its weight upon a plurality of axles. These are all inconveniences which are costly to the contractor.

A comprehensive object of this invention is to alleviate the just mentioned problems encountered with the conventional rear axle drive tractor and weight transfer hitch structure by providing a tractor having both front and rear sets of traction wheels and equipped for use with a weight transferring hitch structure attached to a rear end portion thereof in a manner to cause lines of action of elements thereof which transfer weight from the trailer onto the tractor to intersect at a point between the front and rear axles so the transferred weight is borne by both axles.

Another object is the provision of an improved towing tractor of the weight transferring species according to the preceding object that has diminished over all weight with respect to the conventional rear axle drive tractor, without sacrificing the inherent traction capability thereof attributable solely to its static weight, and capable of more efficient use of transferred weight than the rear axle drive tractor.

A further object is the provision of a front and rear axle drive tractor equipped for receiving traction-improving weight from a vehicle towed thereby and having an inherent traction capability enabling it to excel the traction of a heavier rear axle drive tractor of greater over-all weight and to utilize the cost saving incurred by the weight reduction to substantially offset the cost of the front axle driving mechanism.

Still a further object is the provision of a front and rear axle driving tractor equipped with weight transferring hitch anchorage means facilitating selection of anchorage position relation for weight transferring hitch force-exerting members for changing the position fore and aft of the tractor between the front and rear axles thereof where force lines of such hitch members intersect for selectively determining the ratio of weight transferred onto the front and rear axles. The distribution of transferred weight upon the front and rear axles is influenced by the relative size and degree of inflation of the front and rear tires as fully explained hereinafter.

Heretofore when traction improving weight has been derived from a trailer for a tractor having front and rear sets of traction wheels, it has been the practice to use a gooseneck extending forwardly from the trailer vehicle and connected with an upper portion of the tractor body between the sets of wheels. This arrangement has had the disadvantage of constantly transferring the weight, and the further disadvantage that the gooseneck mounting means dominates the space normally desired for the operator's compartment upon the tractor, particularly if the gooseneck is connected sufficiently forwardly upon the tractor body to distribute the transferred weight equally upon the forward and rear sets of traction wheels. Another object of this invention is the provision of a tractor having front and rear sets of traction wheels and provided with vertically spaced hitch anchorage means disposed upon a rear end portion thereof for cooperation with a weight transferring hitch structure of the above described species so it is operable, when energized, to cause the transferred weight to be imposed upon the front and rear sets of wheels.

A further object is the provision of a tractor having forward and rear sets of traction wheel wherein upper and lower hitch-attaching anchorages on a rear body portion of the tractor are so disposed with respect to a point mid-way between the centers of the front and rear sets of wheels and at the same elevation as the lower anchorage that a line inclining rearwardly from such point at an angle of at least substantially 30 degrees passes through the uppermost anchorage.

A further object is the provision of a vehicle train wherein a tractor having forward and rear sets of traction wheels is connected with a front-and-rear-axle trailer through a hitch structure including a draft member extending horizontally between the front end of the trailer and a rear portion of the tractor at a position of low elevation and an expansible strut pivotally connected with a front portion of the trailer above the connection of the draft member therewith and declining forwardly into pivotal connection with an anchorage on the rear end of the tractor above the connection of the draft member therewith, and the line or action of the strut intersecting the line of action of the draft member at a point between the centers of the front and rear sets of traction wheels.

The above and other desirable objects inherent in encompassed by the invention are elucidated in the ensuing specification, the appended claims, and the annexed drawing wherein:

Fig. 1 is a side elevational view of a tractor and trailer behind two axle self loading scraper vehicle connected together by a weight-transferring hitch structure having parts connected with the tractor in accordance with the principles of this invention, there being parts removed and broken away for exposing other parts.

Fig. 2 is an enlarged scale fragmentary perspective view of the frame body of the tractor together with weight-transferring hitch anchorages upon the rear portion of such body.

Fig. 3 is an enlarged scale side elevational view showing a modified form of hitch strut anchorage means on an upper fragment of the rear body portion of the tractor.

With continued reference to the drawings there is shown in Fig. 1 a four-wheel-drive tractor 10 in towing relation with a trailer 11 in the form of a two axle self loading scraper. A weight-transferring hitch structure 12 comprising a forcibly expandible strut 13 and a tongue or draft member 14 interconnects the tractor and trailer.

The trailer transverse rear axle 15 has rubber tired wheels 16 and 17 journalled upon opposite ends thereof. A front axle 18 of the trailer has rubber tired wheels 19 and 21 journalled upon its opposite ends. The trailer body 22 extends between and is supported upon the front and rear axles 18 and 15 and hence upon the rear wheels or ground supports 16, 17 and upon the front wheels or ground supports 19, 21.

The front end of the trailer body 22 includes a gooseneck 23 having the upper element 24 of a fifth wheel structure 25 mounted upon its forward lower end. This fifth wheel structure pivotally connects the mid portion of the front axle 18 with the front end of the gooseneck for pivotal movement with respect thereto about a vertical axis so that lateral swinging of the draft member 14 will swing the axle 18 about such vertical axis for conventionally steering the trailer. A draft member mounting structure 26 rigidly connected with the axle 18 projects forwardly therefrom and the draft member 14 is pivotally connected by pin means 27 with the structure 26 to adapt the draft member to swing vertical relatively to the structure 26. This pin 27 and the fifth wheel 25 constitute lower anchorage means pivotally connecting the rear end portion of the draft member with the trailer for swinging both horizontally and vertically and adapting the draft member to impart steering motion to the front ground support means 19, 21 when swung horizontally. Upper anchorage means universally pivotally connecting a rear end portion of the strut 13 with a front portion of the trailer body above the draft member 14 includes a bracket 28 mounted upon an upper forward portion of the gooseneck 23. This bracket 28 has upper and lower furcations 29 and 31 in which is mounted a pin 32 for pivotally connecting with rear portions 33 of a universal joint element 34. A horizontal pin 35 pivotally connects the forward portion of the element 34 with the rear end of a piston rod 36 of the expandible strut 13. This strut is in the form of an hydraulic ram including the piston rod 36 and a cylinder 37. When fluid is introduced into the lower end of the cylinder 37 under pressure through a conduit 38 the piston rod 36 will be caused to move outwardly of the rear end of the cylinder attendant to the strut 13 being forcibly expanded. Means for controlling the pressure of liquid imposed upon the ram through the conduit 38 and becoming instantaneously effective at the will of the tractor operator, is disclosed in my United States Patent No. 2,459,098.

The tractor 10 has a set of front traction wheels 39, 41 and a set of rear traction wheels 42 of which only the one on the side of the vehicle opposite from the observer is shown in the drawing. The rear wheels 42 are rotatably mounted upon the outer ends of axle housings 43, 44 projecting transversally of the tractor from opposite sides of a differential casing 45 constituting a rear end portion of a frame body 46 of the tractor; see Fig. 2. Driving force is transmitted to the rear traction wheels 42 respectively through axles 47 and 48 driven from the differential (not shown) within the casing 45 and extending outwardly through the axle housings 43, 44. The frame body 46 also comprises side sills 49 and 51 of box section rigidly mounted on the casing 45 at opposite ends of its forward wall 52 and projecting forwardly therefrom on opposite sides of the fore and aft median line ML of the tractor. The front ends of the side sills 49 and 51 are respectively carried upon leaf spring units 53 mounted upon opposite ends of a transversally extending front differential housing 54, one being shown in Fig. 1. Axles 55 extending from opposite ends of the housing 54 and including the customary constant velocity universal joints (not shown) respectively drive the front wheels 39 and 41. A steering wheel 56 in the tractor operator's compartment 57 is connected with the front wheels in any conventional manner for swinging them for steering the tractor.

The tractor engine 58 drives a clutch (not shown) within a clutch housing 59 and which in turn transmits power to a change-speed gearing unit 61. The driven shaft 62 of the change speed unit 61 extends into and drives a torque-divider unit 63 which has a forwardly extending drive shaft 64 connected with differential gearing (not shown) in the front differential housing 54 for transmitting drive to the front traction wheels 39, 41. A rear drive shaft 65 of the torque divider unit is in driving relation with the differential (not shown) in casing 45 forming the rear portion of the frame body 46.

Universally articulate means for connecting the forward end of the expandible strut 13 with the upper rear portion of the tractor body includes a bracket 66 having vertically spaced furcations 67 and 68 straddling a bearing 69 of a universal joint member 71 and holding a pivot pin 72 upon which the bearing portion 69 is journalled. The universal joint member 71 contains a horizontal pin 73 pivotally mounting the forward end of the strut cylinder 37. Means universally articulately connecting the front end portion of the draft member 14 with a rear body portion of the tractor comprises a bracket 74 mounted on the lower rear side of the differential casing 45. This bracket has vertically spaced furcations 75 and 76 in which is mounted a pivot pin 77 for a universal joint member 78 holding a horizontal pivot pin 79 for the front end of the draft member 14.

In the operation of the apparatus, assuming that the traction conditions for the tractor are poor so it becomes difficult or impossible for the tractor to tow the loaded trailer 11 while the hitch structure 12 is relaxed, the tractor operator will effect operation of a hydraulic circuit (not shown) as that described in my Patent No. 2,459,098 to force a liquid, preferably oil, into the hitch cylinder 37 through the conduit shown fragmentarily at 38. The pressure thus produced in the forward lower end of the cylinder 37 is ordinarily of a value to extend the ram 13 far enough to lift the front end of the trailer only partially to take some of the flex out of the ground contacting lower sides of the pneumatic tires of the wheels 19 and 21 without actually lifting the tires out of complete contact with the ground. This energization of the hitch structure 12 creates a thrust force between the upper anchorage means including the universal joint member 34 on the front end of the trailer and the upper anchorage means including the universal joint member 71 on the back portion of the tractor. The line of action of this thrust force for the extended strut 13 is represented by the dot-dash line LAS extending downwardly and forwardly to the point X. The draft member 14 prevents endwise separation of the tractor and trailer during the thrust exerted by the energized strut 13 wherefore the tensile force thus created in the draft member 14 operates along a line of action represented by the dot-dash line LAD which intersects the line of action LAS of the strut at the point X. Force vector V represents the vertical component of force imposed upon the tractor due to the weight transferred thereonto from the energized hitch 12. This weight transferred onto the tractor will be at the intersection point X of the lines of action LAS and LAD. Therefore to cause the transferred weight to have the effect of being imposed upon the tractor mid-way between front and rear sets of traction wheels, that is, mid-way between the axles 55 and 47 as viewed in Fig. 1, the anchorage means including the universal joint member 71 on the rear end portion of the tractor is disposed at the elevation with respect to the lower anchorage means including the universal joint member 78 that the point X intersected by the lines LAS and LAD will be mid-way between the front and rear traction wheel sets. By thus imposing the transferred weight equally upon all four of the tractor traction wheels, no one of them is left without traction improvement which greatly increases the tractive effort capability of the tractor.

Attention is invited to the fact that the weight transferred from the trailer to all four traction wheels of the tractor by energizing the hitch structure 12 in the manner explained, is accomplished with the use of hitch structure connections with the tractor solely on the rear portion of the tractor frame 46 and therefore without requiring any portion of the space occupied by the normally disposed operator's compartment.

Because of the magnitude of force applied to the tractor along the lines of action LAS and LAD pursuant to energization of the hitch structure, the frame side sills 49 and 51 are constructed ruggedly and have a relatively long vertical area of connection with the differential casing 45. The downward force component transferred through the hitch structure for the front traction wheels 39 and 41 is transmitted through these side sills 49 and 51 and the leaf spring units 53. Thus the side sills 49 and 51 in addition to providing a cradle support for the tractor engine 58, the clutch housing 59, the transmission 61 and the transfer case 63 provide frame structure elements of sufficient strength and ruggedness for transmitting and distributing the transferred weight onto the four traction wheels. To limit the stress applied to the tractor frame by the energized hitch to an amount not requiring that such frame be too massive and costly when designed to withstand such stress, I have found it desirable to arrange the anchorages for the two ends of the draft member 14 and of the strut 13 so the line of action LAD is substantially horizontal and so the line of action LAS inclines rearwardly from point X at an angle of at least substantially 30 degrees with respect to the horizontal.

The industry designation for a four-wheel tractor having two traction wheels is the symbol 4X2, whereas the designation for a four-wheel tractor of which all four wheels are traction drive wheels is 4X4. Pronounced advantages of the present invention utilizing the 4X4 tractor instead of the 4X2 tractor will become apparent from the following illustrations.

First consider a 4X2 tractor with a weight transfer hitch adapted to transfer weight only onto the two traction wheels which are at the rear. Typically this tractor could have a total contained weight of 38,000 lbs. with 10,000 lbs. on the front wheels and 28,000 lbs. on the rear traction wheels. The 28,000 lb. weight on the traction wheels is necessary to enable the tractor to tow a loaded self-loading scraper or other loaded trailer over an off-the-highway course without the weight-transfer hitch structure being hydraulically energized such a great percentage of the time that would incur too frequent servicing. If this vehicle is driven on an improved highway, sufficient equipment and parts thereof must first be removed to reduce the rear axle weight to the legal limit of 18,000 lbs., for example.

A 4X4 tractor with a different weight distribution between the front and rear axles avoids highway overweight for either axle without sacrifice of traction weight and with certain additional advantages. Consider a 4X4 tractor weighing 28,000 lbs. having a rear axle weight of 18,000 lbs. which is within the legal highway limit and a front axle weight of 10,000 lbs. The traction weight of this tractor is the same as the 38,000 lb. tractor just analyzed, although it has the advantage of having 10,000 lbs. less contained weight to be propelled wherefore more of the traction capability is available to increase up-hill draw-bar pull. The cost saving in diminished weight of the 4X4 tractor with respect to the 4X2 tractor is augmented by a further cost saving in diminished size and load capacity tires on the rear axle wheels, and these savings essentially offset the cost of the front wheel drive assembly.

Referring now to Fig. 3, the bracket 66 there shown upon a fragment of the tractor differential housing 45 has associated therewith a plurality of elements to form therewith another species of weight-transferring-strut attaching pivot anchorage for cooperating with the strut 13 shown in Fig. 1. In this species of the invention a pivot pin 81 pivotally attaches a sleeve 82 between the bracket furcations 67 and 68 of the bracket 66. A rear side of the sleeve 82 has a pair of laterally spaced ears 83 in which there is disposed a pin 84 for pivotally attaching a lever 85 having connecting means in the form of a hole 86 at the outer end thereof and adapted to receive the pin 73 of Fig. 1 for attaching the lower end of the strut 13 thereto. This strut connecting means 86 is placeable at selectable elevations attendant to pivotal adjustment of the lever 85 about the pivot pin 84. Means for selectively pivoting and maintaining the selective pivoted position of the lever 85 includes a bracket 87 resting upon the furcation 68 of the bracket 66 and pivotally mounted upon the pin 81. Laterally spaced ears 88 of the bracket 87 respectively receive and journal diametrically opposite trunnion bearings 89 of an internally threaded nut 91 of which the threads mesh with those upon a threaded portion 92 of a crank 93. The lower end of the crank threaded portion 92 is pivotally connected with the lever 85 by a coupling member 94 which is pivotally connected to the lever by a pin 95. Hooks 96 and 98 at the upper end of the member 94 receive a head 97 at the lower end of the crank and maintain this head connected with the member 94 while facilitating rotation of the crank portion 92 in the threaded nut 91. The operator of the apparatus, by rotating the crank 93 can cause pivoting of the lever 85 to selectively change the elevation of the strut connecting means 86 and thereby change the position as X and X', shown in Fig. 1, at which the line of action of the strut 13 intersects the line of action LAD of the draft member 14 fore and aft of the tractor between the axles 47 and 55. It will be apparent from the above description how this adjustment of the crank 93 enables the operator to selectively proportionate transferred weight between the front and rear traction wheels of the tractor. By using the form of anchorage means shown in Fig. 3 in lieu of the species of strut attaching anchorage means shown in Fig. 1, an infinite number of positions between the front and rear traction wheels are selectable for effectively imposing the transferred weight onto the tractor. In Fig. 1 the ram connecting means including the pins 73 and 71' provide two positions of selective elevation for connection of the weight-transferring-strut 13.

Having described a single preferred embodiment of the invention with the view of clearly and concisely illustrating the same, I claim:

1. A tractor-trailer unit including a tractor having a set of front traction wheels, a set of rear traction wheels and a frame body having a rear portion mounted on and disposed between the wheels of the rear wheel set and sill members connected with the rear body portion and projecting forwardly therefrom on opposite sides of a fore and aft median line of the tractor and supported at forward portions thereof upon the front wheel set; a trailer for being towed behind the tractor and including front and rear ground supports of which the front support is dirigible, and a body extending between and mounted upon such supports; and a weight-transfer hitch structure inter-connecting the tractor and trailer, comprising a draft member having a rear end portion connected with the trailer and projecting endwise forwardly therefrom toward the tractor, means pivotally connecting the rear end portion of the draft member with the trailer for swinging both horizontally and vertically and adapting the draft member to impart steering motion to the front ground support when swung horizontally, means universally articulately connecting a front end portion of the draft member with said rear body portion of the tractor, an elongated strut forcibly expandible in length, means universally pivotally connecting a rear end portion of the strut with a front portion of the trailer body above the rear end connecting means for the draft member, and universally articulate means connecting the forward end of the strut with said rear portion of the tractor body above the connecting means for the front end of the draft member and below the universally articulate means at the rear end of the strut to dispose the line of action of the strut at a forwardly declining angle causing such line of action to intersect the line of action of the draft member at a point between the front and rear sets of tractor wheels to adapt the hitch structure for transferring weight from the trailer onto both the front and rear sets of traction wheels attendant to expansion of the strut.

2. For use with a trailer having front and rear ground supports, a body supported upon and extending between such ground supports, upper anchorage means and lower anchorage means both disposed at the front end of said body and the lower anchorage means being operably connected with the front ground support for imparting steering movement thereto; the combination of a tractor having front and rear sets of traction wheels and a frame body having a rear portion mounted on and disposed between the wheels of the rear wheel set and sill members connected with the rear body portion and projecting forwardly therefrom on opposite sides of a fore and aft median line of the tractor and supported at forward portions thereof upon the front wheel set; and a weight-transferring hitch structure comprising a draft member having front and rear end portions, means universally articulately connecting the front end portion of the draft member with a low elevation rear portion of the tractor body rear portion; the rear end portion of the draft member being adapted for connection with the lower anchorage means on the trailer to dispose the draft member in a ground-clearing position while the front end thereof is connected with the tractor, and an elongated strut forcibly expandible in length and having front and rear end portions, the strut rear end portion being connectible with the upper anchorage means on the trailer body, and means universally pivotally connecting the front end portion of the strut with the rear portion of the tractor body above the connecting means for the front end of the draft member and at an elevation to effect such a forward declination of the strut from the trailer upper anchorage means that the line of action of the strut intersects the line of action of the ground-clearing disposed draft member between the front and rear wheel sets of the tractor.

3. In a tractor for receiving traction improving weight transferred thereto from a vehicle towed therebehind through a weight-transferring hitch structure; the combination of a set of front traction wheels, a set of rear traction wheels, a frame body having a rear portion mounted on and disposed between the wheels of the rear wheel set and sill members connected with the rear body portion and projecting forwardly therefrom on opposite sides of a fore and aft median line of the tractor and supported at forward portions thereof upon the front wheel set, a lower draft-member-attachment pivot anchorage on the rear end of such body, an upper strut-attaching pivot anchorage on the rear end of such body, the upper anchorage being at such elevation relatively to the lower anchorage as to coincide with a line inclining rearwardly at an angle of at least substantially 30 degrees with respect to the horizontal from a point mid-way between the centers of the tractor wheel sets and at the same elevation as the lower anchorage, and a weight-transferring strut attached to said upper anchorage, and said strut being selectively energizable to forcibly elongate the same to react between the upper anchorage and the towed vehicle.

4. In a tractor for receiving traction-improving weight transferred thereto from a vehicle towed therebehind through a weight-transferring hitch structure; the combination of a set of front traction wheels, a set of rear traction wheels, a frame body having a rear portion mounted on and disposed between the wheels of the rear wheel set and sill members connected with the rear body portion and projecting forwardly therefrom on opposite sides of a fore and aft median line of the tractor and supported at forward portions thereof upon the front wheel set, a lower draft-member-attaching pivot anchorage on said rear portion of said body rearwardly of and below the centers of the rear wheels, an upper strut-attaching pivot anchorage on such rear portion of the body above and rearwardly of the centers of the rear wheels and in a position to coincide with a line including rearwardly at an angle of at least subsbtantially 30 degrees with respect to the horizontal from a point mid-way between the centers of the tractor wheel sets and at the same elevation as the lower anchorage, and a weight-transferring strut attached to said upper anchorage, and said strut being selectively energizable to forcibly elongate the same to react between the upper anchorage and the towed vehicle.

5. In a tractor for receiving traction-improving weight transferred thereto from a vehicle towed therebehind through a weight-transferring-hitch structure; a rear set of traction wheels; a forward set of traction wheels; a frame body including a rear portion disposed between the wheels of the rear set, and sill members rigidly connected with the rear body portion and projecting forwardly therefrom on opposite sides of a fore and aft median line of the tractor and supported at forward portions thereof upon the front wheel set; a lower draft-member-attaching pivot anchorage on a rear portion of said body rearwardly of and below the centers of the rear set wheels; an upper strut-attaching pivot anchorage on such rear portion of the body above and rearwardly of the centers of the rear set wheels; and a weight-transferring strut attached to said upper anchorage, and said strut being selectively energizable to forcibly elongate the same to react between the upper anchorage and the towed vehicle.

6. In a tractor for receiving traction-improving weight transferred thereto from a vehicle towed therebehind through a weight-transferring hitch structure; a set of rear traction wheels; a set of forward traction wheels; a frame body comprising a differential housing disposed between the rear traction wheels, axle housings projecting laterally oppositely from the differential housing toward the rear traction wheels and respectively mounted thereon, and side sills rigidly mounted upon the differential housing respectively adjacent the rear axle housings and projecting forwardly in lateral spaced relation upon opposite sides of a fore and aft median line of the tractor; means mounting forward end portions of the sills upon the forward traction wheel set; a lower draft-member-attaching pivot anchorage on the rear portion of said body rearwardly of and below the centers of the rear set wheels; an upper strut-attaching pivot anchorage on such rear portion of the body above and rearwardly of the centers of the rear set wheels; and a weight-transferring strut attached to said upper anchorage, and said strut being selectively energizable to forcibly elongate the same to react between the upper anchorage and the towed vehicle.

7. In a vehicle train, a tractor comprising a set of rear traction wheels, a set of front traction wheels, a frame body having a rear portion mounted on and disposed between the wheels of the rear wheel set and sill members connected with the rear body portion and projecting forwardly therefrom on opposite sides of a fore and aft median line of the tractor and supported at forward portions thereof upon the front wheel set, and upper and lower hitch anchorages on said rear portion of the body with the lower anchorage being below the rear wheel axes and the upper anchorage above such axes, the front wheels having a weight-carrying capacity exceeded by the rear wheels; a vehicular trailer comprising front and rear sets of wheels, a body mounted on and extending between such sets of wheels, and a hitch anchorage on an upper front portion of the trailer body; a weight-transferring hitch structure comprising a substantially horizontal draft member universally articulately connected at a rear end thereof with the front end of the trailer and the front wheels thereof for imparting steering movement to such wheels when swung horizontally, the front end of the draft member having a universally articulate connection with the lower anchorage means on the tractor, and a hydraulically expansible strut universally articulately connected at a rear end thereof with the anchorage on the upper front portion of the trailer and extending downwardly and forwardly into universal articulate connection with the upper tractor anchorage, the hitch structure being operable responsively to imposition of fluid under pressure into the strut to elongate such strut and thus energize the hitch structure for transferring weight from the trailer onto the tractor, and the relative elevations of the anchorage on the trailer and the upper anchorage on the tractor being disposed to cause the line of action of the strut to intersect the line of action of the draft member at a point between the axes of the front and rear sets of tractor wheels to impose the transferred weight onto both sets of wheels, but said point being more proximate to the rear wheel axes to impose a greater portion of the transferred weight onto such rear wheels as a function of their greater weight-carrying capacity in relation to the front wheels.

8. In a tractor for receiving traction improving weight transferred thereto from a vehicle towed therebehind through a weight-transferring hitch structure; the combination of a set of front traction wheels, a set of rear traction wheels, a frame body having a rear portion mounted on and disposed between the wheels of the rear wheel set and sill members connected with the rear body portion and projecting forwardly therefrom on opposite sides of a fore and aft median line of the tractor and supported at forward portions thereof upon the front wheel set, a lower draft-member-attachment pivot anchorage on the rear end of such body, an upper strut-attaching pivot anchorage on the rear end of such body, said upper anchorage including connecting means of selectable elevation for the connection of a weight-transferring strut thereto, and a weight-transferring strut attached to said upper anchorage, and said strut being selectively energizable to forcibly elongate the same to react between the upper anchorage and the towed vehicle.

9. The combination set forth in claim 8, wherein said connecting means is selectable at an elevation relatively to the lower anchorage as to coincide with a line inclining rearwardly at an angle of at least substantially 30 degrees with respect to the horizontal from a point mid-way between the centers of the tractor wheel sets and at the same elevation as the lower anchorage.

10. In a tractor for receiving traction improving weight transferred thereto from a vehicle towed therebehind through a weight-transferring hitch structure; the combination of a set of front traction wheels, a set of rear traction wheels, a frame body having a rear portion mounted on and disposed between the wheels of the rear wheel set and sill members connected with the rear body portion and projecting forwardly therefrom on opposite sides of a fore and aft median line of the tractor and supported at forward portions thereof upon the front wheel set, a lower draft-member-attachment pivot anchorage on the rear end of such body, an upper weight-transferring-strut attaching pivot anchorage on the rear end of such body, said upper anchorage including connecting means for the connection of a weight-transferring-strut thereto and being adjustable in elevation, means for selectively varying the elevation of such connecting means, and a weight-transferring strut attached to the connecting means of the upper anchorage, and said strut being selectively energizable to forcibly elongate the same to react between such upper anchorage and the towed vehicle.

References Cited in the file of this patent

UNITED STATES PATENTS

| | | |
|---|---|---|
| 2,187,970 | Greer | Jan. 23, 1940 |
| 2,347,898 | Ferguson | May 2, 1944 |
| 2,360,901 | Simmons | Oct. 24, 1944 |
| 2,459,098 | Simmons | Jan. 11, 1949 |

FOREIGN PATENTS

| | | |
|---|---|---|
| 113,398 | Australia | July 17, 1941 |
| 606,688 | Great Britain | Aug. 18, 1948 |